(12) United States Patent
He et al.

(10) Patent No.: US 12,194,662 B2
(45) Date of Patent: Jan. 14, 2025

(54) CONTROL DEVICE, SYSTEM AND METHOD FOR VERTICAL-HORIZONTAL COUPLING VIBRATION OF CORRUGATED ROLLING MILL

(71) Applicant: TAIYUAN UNIVERSITY OF TECHNOLOGY, Taiyuan (CN)

(72) Inventors: Dongping He, Taiyuan (CN); Chaoran Ren, Taiyuan (CN); Huidong Xu, Taiyuan (CN); Yizhong Cao, Taiyuan (CN); Zhihua Wang, Taiyuan (CN); Tao Wang, Taiyuan (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 262 days.

(21) Appl. No.: 18/154,836

(22) Filed: Jan. 15, 2023

(65) Prior Publication Data
US 2024/0131756 A1  Apr. 25, 2024
US 2024/0227253 A9  Jul. 11, 2024

(30) Foreign Application Priority Data

Oct. 25, 2022 (CN) .......................... 202211313279.X

(51) Int. Cl.
| | |
|---|---|
| *B29C 43/58* | (2006.01) |
| *B29C 43/24* | (2006.01) |
| *B29C 43/46* | (2006.01) |
| *B29C 70/50* | (2006.01) |

(52) U.S. Cl.
CPC ............ *B29C 43/58* (2013.01); *B29C 43/245* (2013.01); *B29C 43/46* (2013.01); *B29C 70/504* (2013.01); *B29C 2043/463* (2013.01)

(58) Field of Classification Search
None
See application file for complete search history.

(56) References Cited

FOREIGN PATENT DOCUMENTS

| | | | |
|---|---|---|---|
| CN | 104190724 A | | 12/2014 |
| CN | 109158430 A | | 1/2019 |
| CN | 110 449 469 A | * | 11/2019 |

OTHER PUBLICATIONS

Jiang et al.: "Study on vibration characteristics of rolling mill based on vibration absorber", Mathematical Models in Engineering; Jun. 2019, vol. 5, Issue 2, p. 64-72 (Year: 2019).*
Wang, Ming et al.: "Design of a damped vibration absorber to control the resonant vibration of roll", Mechanical Systems and Signal Processing, 178 (Year 2022) 109262 (Year: 2022).*

* cited by examiner

*Primary Examiner* — Mohammad M Ameen

(57) ABSTRACT

The present invention belongs to the technical field of control for rolling mill vibration, and particularly relates to a control device, system and method for vertical-horizontal coupling vibration of a corrugated rolling mill. The control device includes a housing; a vibration-absorbing container is arranged in the housing; a steel ball particle group is placed in the vibration-absorbing container; a left side of the vibration-absorbing container is connected with one end of a return spring; the other end of the return spring is fixedly connected with a third base; the third base is fixedly mounted on a third sliding block; and the third sliding block is slidably arranged on a third linear guide rail.

6 Claims, 4 Drawing Sheets

CONTROL DEVICE, SYSTEM AND METHOD FOR VERTICAL-HORIZONTAL COUPLING VIBRATION OF CORRUGATED ROLLING MILL

CROSS REFERENCE TO RELATED APPLICATIONS

This application claims foreign priority of Chinese Patent Application No. 202211313279.X, filed on Oct. 25, 2022 in the China National Intellectual Property Administration, the disclosures of all of which are hereby incorporated by reference.

TECHNICAL FIELD

The present invention belongs to the technical field of rolling mill vibration control, and particularly relates to a control device, system and method for vertical-horizontal coupling vibration of a corrugated rolling mill.

BACKGROUND OF THE PRESENT INVENTION

As large and complex mechanical-electrical-hydraulic integrated equipment, the rolling mill has the features of variability, strong coupling, nonlinearity, time-variation and multiple constraints. With the rapid development of the rolling mill towards large scale, high velocity, continuity and intelligence and the adoption of a large number of novel technologies, many new problems have appeared in rolling mill vibration and are often manifested as the coupling of multiple vibration types, wherein the most common one is vertical-horizontal coupling vibration, which directly affects the stability of rolling process and the quality of rolled pieces and becomes a research focus of many scholars and experts in China and abroad. The control for vertical-horizontal coupling vibration of the rolling mill is mostly realized by changing process parameters (reducing rolling velocity, reducing rolling force and adjusting lubrication characteristics of emulsion), but the passive suppression method of adjusting parameters is usually only applicable to a specific working condition. As equipment with special roll profile, a corrugated rolling mill has prominent advantages of refining grains, improving plate shape and improving bonding strength in the preparation of a composite plate. However, the periodic strong load induced by complex roll profile curves has higher requirements on the control of vertical-horizontal coupling vibration of the rolling mill, which becomes a hotspot and difficulty in the research for the field of rolling mill vibration. The existing research methods of corrugated rolling mill vibration are often expressed by physical quantities such as vibration displacement, vibration velocity or vibration acceleration. Rolling mill vibration is a dynamic process and is transmitted in the form of energy, so the actual situation of corrugated rolling mill vibration cannot be fully reflected by using a single physical quantity to measure the vibration response and vibration transmission of the corrugated rolling mill.

SUMMARY OF PRESENT INVENTION

In view of the above problems, the present invention provides a control device, system and method for vertical-horizontal coupling vibration of a corrugated rolling mill.

To achieve the above purpose, the following technical solutions are adopted in the present invention:

A control device for vertical-horizontal coupling vibration of a corrugated rolling mill includes a housing; a vibration-absorbing container is arranged in the housing; a steel ball particle group is placed in the vibration-absorbing container; a left side of the vibration-absorbing container is connected with one end of a return spring; the other end of the return spring is fixedly connected with a third base; the third base is fixedly mounted on a third sliding block; and the third sliding block is slidably arranged on a third linear guide rail. A right side of the vibration-absorbing container is fixedly connected with an output end of a first linear motor; the first linear motor is fixedly mounted on a first base; the first base is fixedly mounted on a first sliding block; and the first sliding block is slidably arranged on a first linear guide rail. The bottom of the vibration-absorbing container is fixedly connected with an output end of a second linear motor; the second linear motor is fixedly mounted on a second base; the second base is fixedly mounted on a second sliding block; the second sliding block is slidably mounted on a second linear guide rail; and the first linear guide rail, the second linear guide rail and the third linear guide rail are all fixedly mounted on the housing.

Further, the vibration-absorbing container is made of magnesium alloy.

Still further, the steel ball particle group in the vibration-absorbing container accounts for 30%-60% of a total volume of the vibration-absorbing container.

Furthermore, front and rear end surfaces of the vibration-absorbing container are respectively processed with a first rectangular lug boss and a second rectangular lug boss, wherein the first rectangular lug boss is provided with a first end cap; the second rectangular lug boss is provided with a second end cap; a third end cap is mounted at the top of the vibration-absorbing container; a first sealing ring is mounted at a joint between the first end cap and the first rectangular lug boss; a second sealing ring is mounted at a joint between the second end cap and the second rectangular lug boss; and a third sealing ring is mounted at a joint between the third end cap and the vibration-absorbing container.

A control system for vertical-horizontal coupling vibration of a corrugating rolling mill includes a control device for vertical-horizontal coupling vibration, a sensor mounting base, a laser horizontal velocity sensor, a laser vertical velocity sensor, a rolling force sensor, horizontal force sensors, filters, a computer, a horizontal vibration controller and a vertical vibration controller; switching magnetic seats are arranged at left and right sides of a housing in the control device for vertical-horizontal coupling vibration. The control device for vertical-horizontal coupling vibration is adsorbed on an upper balance beam of the corrugated rolling mill by the switching magnetic seats; and the upper balance beam is connected with an upper roll bearing chock. The sensor mounting base is fixedly mounted at one side of a rack. Both the laser horizontal velocity sensor and the laser vertical velocity sensor are mounted on the sensor mounting base, respectively for real-time online non-contact measurement of movement velocities of the upper roll bearing chock in a horizontal direction and a vertical direction during rolling of a composite plate. The rolling force sensor is mounted between a press-down device and the upper roll bearing chock, for real-time measurement of a rolling force in the vertical direction during the rolling of the composite plate. The horizontal force sensors are mounted between the upper roll bearing chock and the rack and between a lower roll bearing chock and the rack; and the horizontal force sensors are used for real-time measurement of a rolling force component in the horizontal direction during the rolling of the composite plate. The laser horizontal velocity sensor, the laser vertical velocity sensor, the rolling force sensor and the horizontal force sensors are all connected with the computer through the filters, for transmitting the measured signals to the computer. The computer calculates a vibration power flow in the vertical direction and a vibration power flow in the horizontal direction according to the measured signals. The computer is connected with the horizontal vibration controller and the vertical vibration controller, for transmitting control signals to the horizontal vibration controller and the vertical vibration controller; and the horizontal vibration controller and the vertical vibration controller are respectively used for controlling the first linear motor and the second linear motor in the control device for vertical-horizontal coupling vibration to work.

A control method for vertical-horizontal coupling vibration of a corrugated rolling mill includes: performing real-time online non-contact measurement of a movement velocity of an upper roll bearing chock in a horizontal direction during rolling of a composite plate by a laser horizontal velocity sensor; performing real-time online non-contact measurement of a movement velocity of the upper roll bearing chock in a vertical direction during the rolling of the composite plate by a laser vertical velocity sensor; performing real-time measurement of a rolling force in the vertical direction during the rolling of the composite plate by a rolling force sensor; performing real-time measurement of a rolling force component in the horizontal direction during the rolling of the composite plate by horizontal force sensors; and receiving signals transmitted back by the laser horizontal velocity sensor, the laser vertical velocity sensor, the rolling force sensor and the horizontal force sensors, and calculating a vibration power flow in the vertical direction and a vibration power flow in the horizontal direction by a computer. Specifically, $$W_{horizontal} = k_{horizontal} \times F_{horizontal} \times V_{horizontal}$$

wherein $W_{horizontal}$ represents the vibration power flow in the horizontal direction, and $k_{horizontal}$ represents a horizontal vibration influence factor;

$F_{horizontal}$ represents the rolling force component obtained by the horizontal force sensors through online real-time measurement;

$V_{horizontal}$ represents the movement velocity of the upper roll bearing chock in the horizontal direction obtained by the laser horizontal velocity sensor through online real-time measurement.

$$W_{vertical} = k_{vertical} \times F_{vertical} \times V_{vertical}$$

wherein $W_{vertical}$ represents the vibration power flow in the vertical direction, and $k_{vertical}$ represents a vertical vibration influence factor;

$F_{vertical}$ represents the rolling force obtained by the rolling force sensor through online real-time measurement;

$V_{vertical}$ represents the movement velocity of the upper roll bearing chock in the vertical direction obtained by the laser vertical velocity sensor through online real-time measurement;

When $W_{horizontal} \geq W_{horizontal0}$, the computer sends a control signal to a horizontal vibration controller, and the horizontal vibration controller starts to work and sends a vibration-absorbing signal to a first linear motor, so that the first linear motor starts to work;

$W_{horizontal0}$ represents a set threshold value of the vibration power flow in the horizontal direction;

When $W_{vertical} \geq W_{vertical0}$, the computer sends a control signal to a vertical vibration controller, and the vertical vibration controller sends a vibration-absorbing signal to a second linear motor, so that the second linear motor starts to work;

$W_{vertical0}$ represents a set threshold value of the vibration power flow in the vertical direction.

Compared with the prior art, the present invention has the following advantages:

The present invention is simple, easy to understand and easy to implement, can implement online judgment of vertical-horizontal coupling vibration of the corrugated rolling mill by the laser horizontal velocity sensor, the laser vertical velocity sensor, the rolling force sensor and the horizontal force sensors, and implements vibration absorption for vertical-horizontal coupling vibration of the corrugated rolling mill by driving the vibration-absorbing container to move via the first linear motor and the second linear motor, thereby optimizing the control performance of the corrugated rolling mill.

According to the present invention, the motion and rolling force of a working roll of the corrugated rolling mill are integrated into a single quantity through power flow, which contains richer vibration information and can accurately reflect the vibration essence of the corrugated rolling mill.

Figure 1:
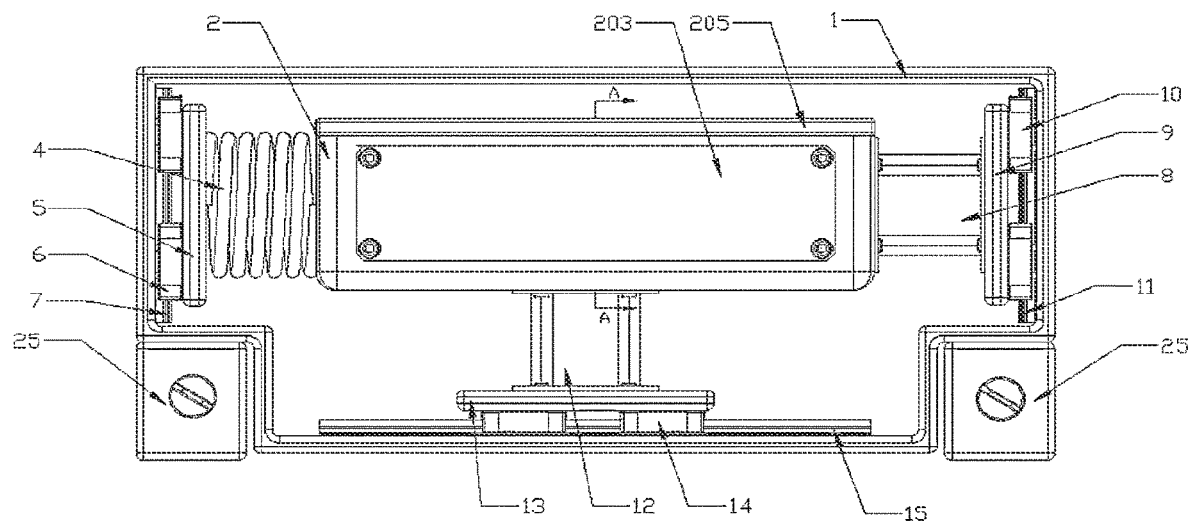
FIG. 1 is a structural schematic diagram of a control device for vertical-horizontal coupling vibration according to the present invention.

In the drawings: housing—1, vibration-absorbing container—2, steel ball particle group—3, return spring—4, third base—5, third sliding block—6, third linear guide rail—7, first linear motor—8, first base—9, first sliding block—10, first linear guide rail—11, second linear motor—12, second base—13, second sliding block—14, second linear guide rail—15, sensor mounting base—16, laser horizontal velocity sensor—17, laser vertical velocity sensor—18, rolling force sensor—19, horizontal force sensor—20, filter—21, computer—22, horizontal vibration controller—23, vertical vibration controller—24, switching magnetic seat—25, upper balance beam—26, upper roll bearing chock—27, press-down device—28, rack—29, lower roll bearing chock—30, first rectangular lug boss—201, second rectangular lug boss—202, first end cap—203, second end cap—204, third end cap—205, first sealing ring—206, second sealing ring—207, and third sealing ring—208.

DETAILED DESCRIPTION OF PREFERRED EMBODIMENTS

To further illustrate the technical solutions of the present invention, the present invention will be further explained below through embodiments.

Figure 2:
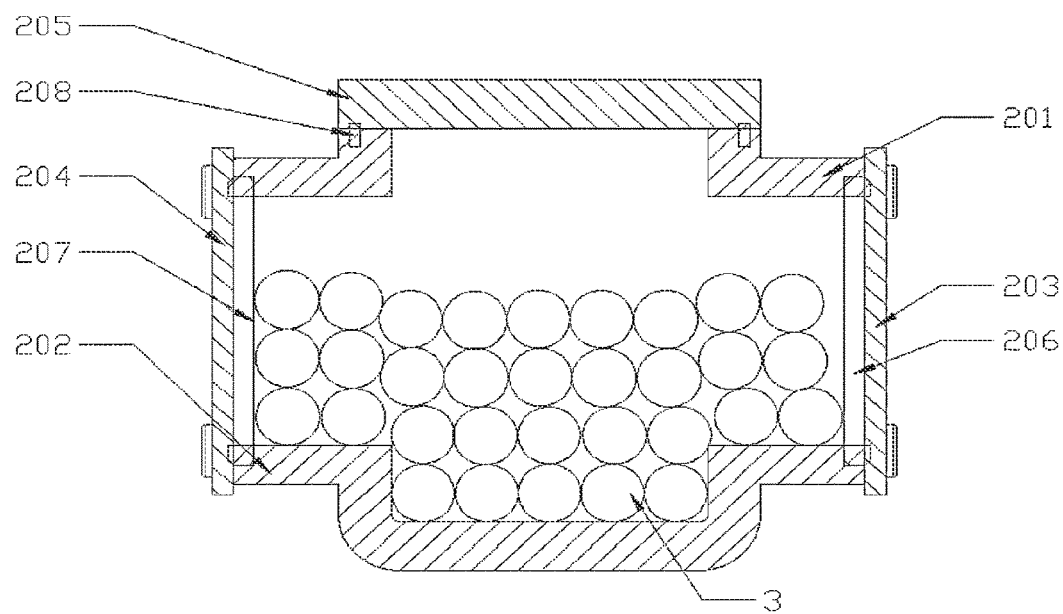
FIG. 2 is a sectional view of a cross section A-A in FIG. 1 according to the present invention.
Figure 3:
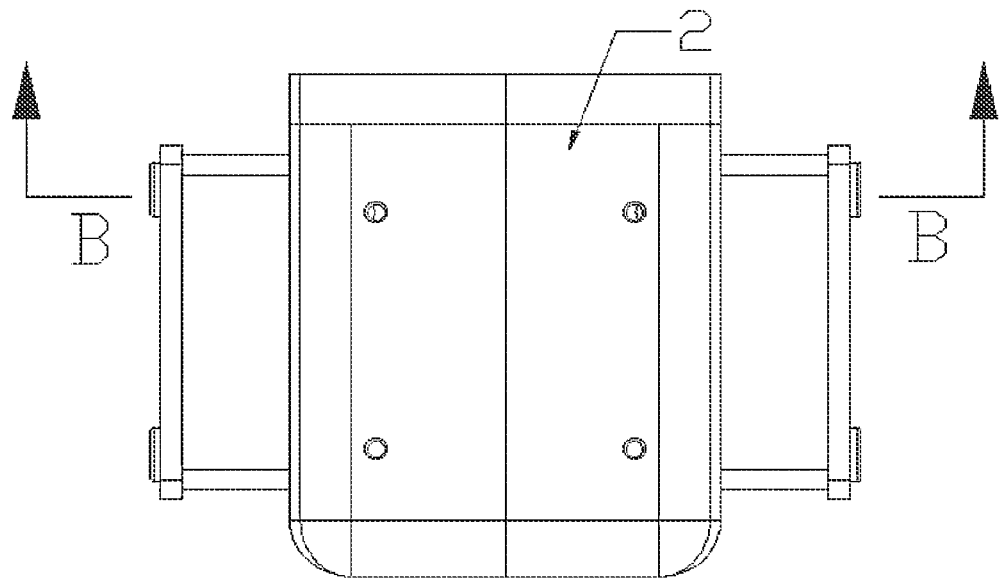
FIG. 3 is a side view of a vibration-absorbing container according to the present invention.
Figure 4:
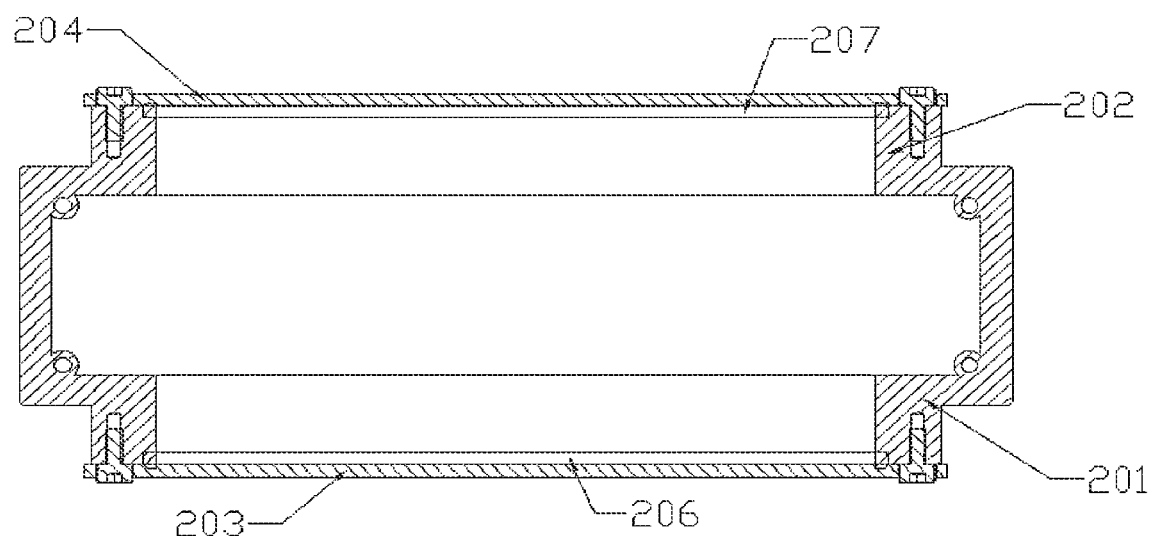
FIG. 4 is a sectional view of a cross section B-B in FIG. 3 according to the present invention.
Figure 5:
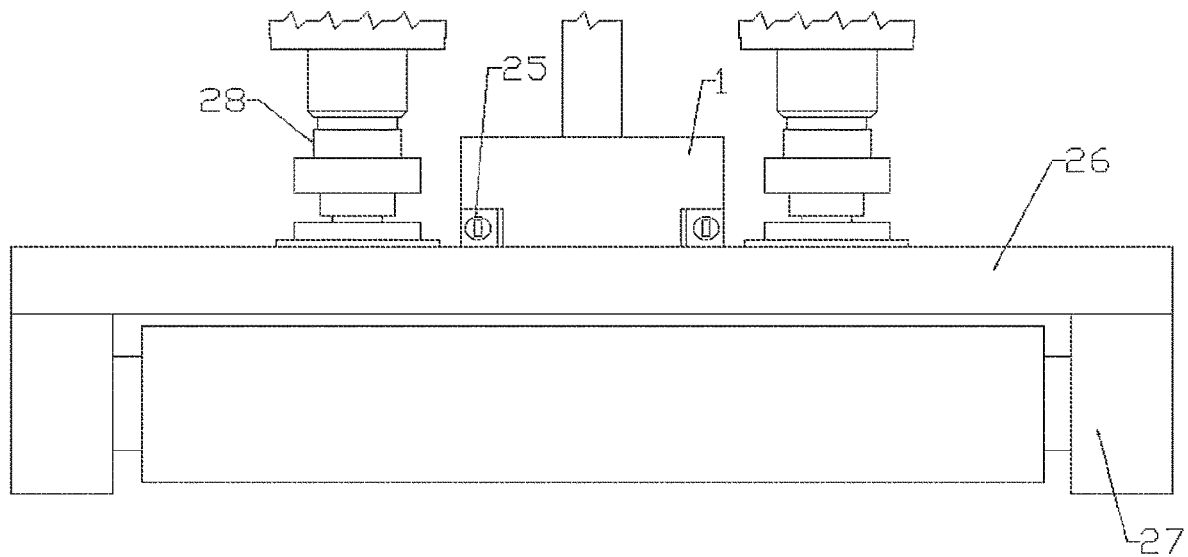
FIG. 5 is a schematic mounting diagram of the control device for vertical-horizontal coupling vibration according to the present invention.
Figure 6:
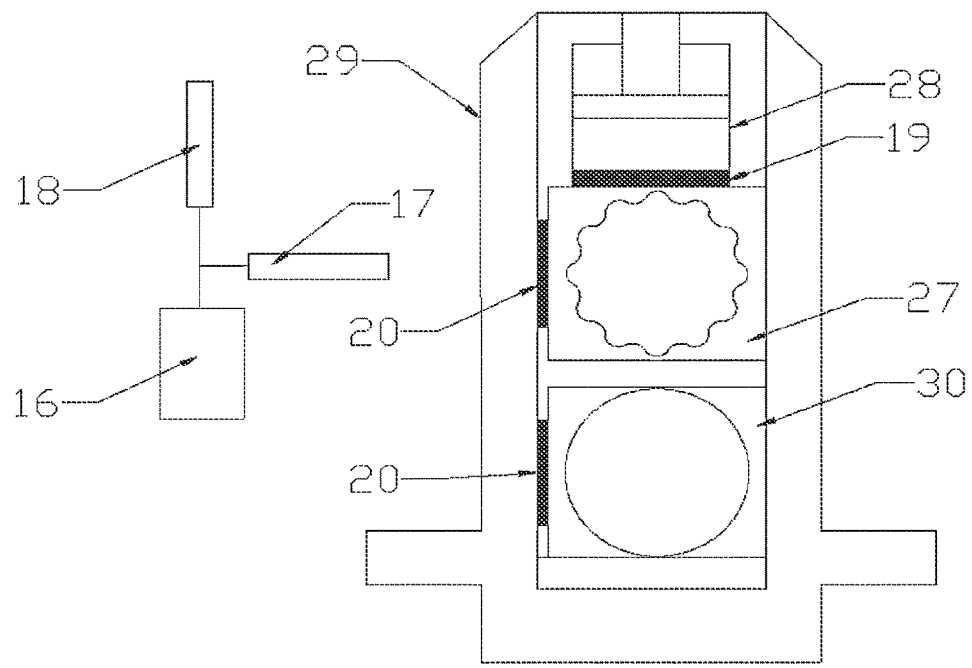
FIG. 6 is a structural schematic diagram of a control system for vertical-horizontal coupling vibration according to the present invention.
Figure 7:
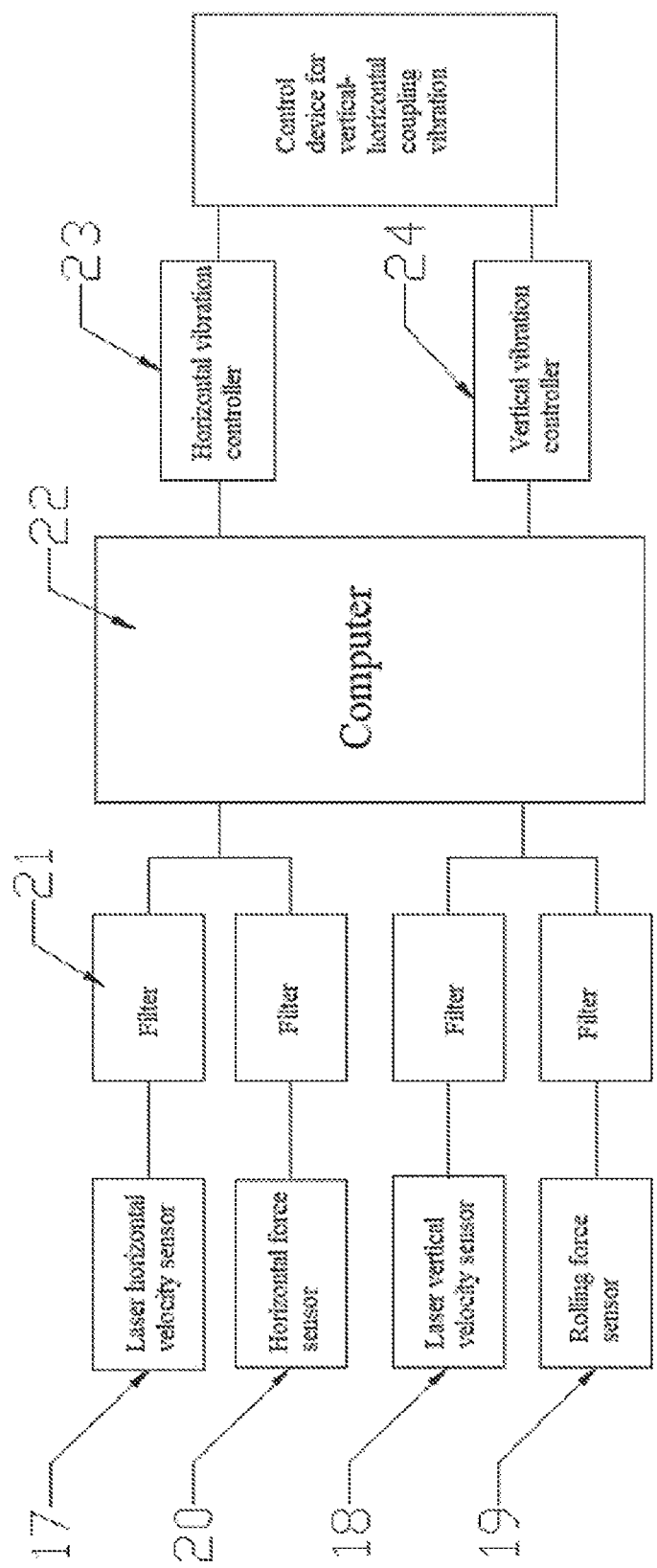
FIG. 7 is a module diagram of the control system for vertical-horizontal coupling vibration according to the present invention.

As shown in FIGS. 1-4, a control device for vertical-horizontal coupling vibration of a corrugated rolling mill includes a housing 1; a vibration-absorbing container 2 is arranged in the housing 1; a steel ball particle group 3 is placed in the vibration-absorbing container 2; a left side of the vibration-absorbing container 2 is connected with one end of a return spring 4; the other end of the return spring 4 is fixedly connected with a third base 5; the third base 5 is fixedly mounted on a third sliding block 6; and the third sliding block 6 is slidably arranged on a third linear guide rail 7. A right side of the vibration-absorbing container 2 is fixedly connected with an output end of a first linear motor 8; the first linear motor 8 is fixedly mounted on a first base 9; the first base 9 is fixedly mounted on a first sliding block 10; and the first sliding block 10 is slidably arranged on a first linear guide rail 11. The bottom of the vibration-absorbing container 2 is fixedly connected with an output end of a second linear motor 12; the second linear motor 12 is fixedly mounted on a second base 13; the second base 13 is fixedly mounted on a second sliding block 14; the second sliding block 14 is slidably mounted on a second linear guide rail 15; and the first linear guide rail 11, the second linear guide rail 15 and the third linear guide rail 7 are all fixedly mounted on the housing 1.

The vibration-absorbing container 2 is made of magnesium alloy. The steel ball particle group 3 in the vibration-absorbing container 2 accounts for 30%-60% of a total volume of the vibration-absorbing container 2. Front and rear end surfaces of the vibration-absorbing container 2 are respectively processed with a first rectangular lug boss 201 and a second rectangular lug boss 202; the first rectangular lug boss 201 is provided with a first end cap 203; the second rectangular lug boss 202 is provided with a second end cap 204; a third end cap 205 is mounted at the top of the vibration-absorbing container 2; a first sealing ring 206 is mounted at a joint between the first end cap 203 and the first rectangular lug boss 201; a second sealing ring 207 is mounted at a joint between the second end cap 204 and the second rectangular lug boss 202; and a third sealing ring 208 is mounted at a joint between the third end cap 205 and the vibration-absorbing container 2.

A control system for vertical-horizontal coupling vibration of a corrugated rolling mill includes a control device for vertical-horizontal coupling vibration, a sensor mounting base 16, a laser horizontal velocity sensor 17, a laser vertical velocity sensor 18, a rolling force sensor 19, horizontal force sensors 20, filters 21, a computer 22, a horizontal vibration controller 23 and a vertical vibration controller 24. Switching magnetic seats 25 are arranged at left and right sides of a housing 1 in the control device for vertical-horizontal coupling vibration. The control device for vertical-horizontal coupling vibration is adsorbed on an upper balance beam 26 of the corrugated rolling mill by the switching magnetic seats 25; and the upper balance beam 26 is connected with an upper roll bearing chock 27. The sensor mounting base 16 is fixedly mounted at one side of a rack 29. Both the laser horizontal velocity sensor 17 and the laser vertical velocity sensor 18 are mounted on the sensor mounting base 16, respectively for real-time online non-contact measurement of movement velocities of the upper roll bearing chock 27 in a horizontal direction and a vertical direction during rolling of a composite plate. The rolling force sensor 19 is mounted between a press-down device 28 and the upper roll bearing chock 27, for real-time measurement of a rolling force in the vertical direction during the rolling of the composite plate. The horizontal force sensors 20 are mounted between the upper roll bearing chock 27 and the rack 29 and between a lower roll bearing chock 30 and the rack 29; and the horizontal force sensors 20 are used for real-time measurement of a rolling force component in the horizontal direction during the rolling of the composite plate. The laser horizontal velocity sensor 17, the laser vertical velocity sensor 18, the rolling force sensor 19 and the horizontal force sensors 20 are all connected with the computer 22 through the filters 21, for transmitting the measured signals to the computer 22. The computer 22 calculates a vibration power flow in the vertical direction and a vibration power flow in the horizontal direction according to the measured signals. The computer 22 is connected with the horizontal vibration controller 23 and the vertical vibration controller 24, for transmitting control signals to the horizontal vibration controller 23 and the vertical vibration controller 24; and the horizontal vibration controller 23 and the vertical vibration controller 24 are respectively used for controlling the first linear motor 8 and the second linear motor 12 in the control device for vertical-horizontal coupling vibration to work.

A control method for vertical-horizontal coupling vibration of a corrugated rolling mill includes: performing real-time online non-contact measurement of a movement velocity of an upper roll bearing chock 27 in a horizontal direction during rolling of a composite plate by a laser horizontal velocity sensor 17; performing real-time online non-contact measurement of a movement velocity of the upper roll bearing chock 27 in a vertical direction during the rolling of the composite plate by a laser vertical velocity sensor 18; performing real-time measurement of a rolling force in the vertical direction during the rolling of the composite plate by a rolling force sensor 19; performing real-time measurement of a rolling force component in the horizontal direction during the rolling of the composite plate by horizontal force sensors 20; and receiving signals transmitted back by the laser horizontal velocity sensor 17, the laser vertical velocity sensor 18, the rolling force sensor 19 and the horizontal force sensors 20, and calculating a vibration power flow in the vertical direction and a vibration power flow in the horizontal direction by a computer 22. Specifically, $$W_{horizontal} = k_{horizontal} \times F_{horizontal} \times V_{horizontal}$$

wherein $W_{horizontal}$ represents the vibration power flow in the horizontal direction, and $k_{horizontal}$ represents a horizontal vibration influence factor;

$F_{horizontal}$ represents the rolling force component obtained by the horizontal force sensors 20 through online real-time measurement;

$V_{horizontal}$ represents the movement velocity of the upper roll bearing chock 27 in the horizontal direction obtained by the laser horizontal velocity sensor 17 through online real-time measurement.

$$W_{vertical} = k_{vertical} \times F_{vertical} \times V_{vertical},$$

wherein $W_{vertical}$ represents the vibration power flow in the vertical direction, and $k_{vertical}$ represents a vertical vibration influence factor;

$F_{vertical}$ represents the rolling force obtained by the rolling force sensor 19 through online real-time measurement;

$V_{vertical}$ represents the movement velocity of the upper roll bearing chock 27 in the vertical direction obtained by the laser vertical velocity sensor 18 through online real-time measurement;

When $W_{horizontal} \geq W_{horizontal0}$, the computer 22 sends a control signal to a horizontal vibration controller 23, and the horizontal vibration controller 23 starts to work and sends a vibration-absorbing signal to a first linear motor 8, so that the first linear motor 8 starts to work;

$W_{horizontal0}$ represents a set threshold value of the vibration power flow in the horizontal direction;

When $W_{vertical} \geq W_{vertical0}$, the computer 22 sends a control signal to a vertical vibration controller 24, and the vertical vibration controller 24 sends a vibration-absorbing signal to a second linear motor 12, so that the second linear motor 12 starts to work;

$W_{vertical0}$ represents a set threshold value of the vibration power flow in the vertical direction.

Main features and advantages of the present invention are shown and described above. It is apparent to those skilled in the art that the present invention is not limited to the details of the above exemplary embodiments, and can be implemented in other specific forms without departing from the spirit or essential features of the present invention. Therefore, the embodiments shall be regarded as illustrative and non-restrictive in any case. The scope of the present invention is defined by the appended claims rather than the above description, so the present invention aims to incorporate all changes that fall within the meaning and scope of equivalents of the claims.

In addition, it should be understood that although the description is described according to the embodiments, not every embodiment only includes one independent technical solution. The description is illustrated in such a manner only for the sake of clarity. Those skilled in the art shall take the description as a whole; and the technical solutions in various embodiments can also be appropriately combined to form other embodiments understandable to those skilled in the art.

We claim:

1. A control device for vertical-horizontal coupling vibration of a corrugated rolling mill, comprising a housing (1), wherein a vibration-absorbing container (2) is arranged in the housing (1); a steel ball particle group (3) is placed in the vibration-absorbing container (2); a left side of the vibration-absorbing container (2) is connected with one end of a return spring (4); the other end of the return spring (4) is fixedly connected with a third base (5); the third base (5) is fixedly mounted on a third sliding block (6); the third sliding block (6) is slidably arranged on a third linear guide rail (7); a right side of the vibration-absorbing container (2) is fixedly connected with an output end of a first linear motor (8); the first linear motor (8) is fixedly mounted on a first base (9); the first base (9) is fixedly mounted on a first sliding block (10); the first sliding block (10) is slidably arranged on a first linear guide rail (11); the bottom of the vibration-absorbing container (2) is fixedly connected with an output end of a second linear motor (12); the second linear motor (12) is fixedly mounted on a second base (13); the second base (13) is fixedly mounted on a second sliding block (14); the second sliding block (14) is slidably mounted on a second linear guide rail (15); and the first linear guide rail (11), the second linear guide rail (15) and the third linear guide rail (7) are all fixedly mounted on the housing (1).

2. The control device for vertical-horizontal coupling vibration of the corrugated rolling mill according to claim 1, wherein the vibration-absorbing container (2) is made of magnesium alloy.

3. The control device for vertical-horizontal coupling vibration of the corrugated rolling mill according to claim 1, wherein the steel ball particle group (3) in the vibration-absorbing container (2) accounts for 30%-60% of a total volume of the vibration-absorbing container (2).

4. The control device for vertical-horizontal coupling vibration of the corrugated rolling mill according to claim 1, wherein front and rear end surfaces of the vibration-absorbing container (2) are respectively processed with a first rectangular lug boss (201) and a second rectangular lug boss (202); the first rectangular lug boss (201) is provided with a first end cap (203); the second rectangular lug boss (202) is provided with a second end cap (204); a third end cap (205) is mounted at the top of the vibration-absorbing container (2); a first sealing ring (206) is mounted at a joint between the first end cap (203) and the first rectangular lug boss (201); a second sealing ring (207) is mounted at a joint between the second end cap (204) and the second rectangular lug boss (202); and a third sealing ring (208) is mounted at a joint between the third end cap (205) and the vibration-absorbing container (2).

5. A control system based on the control device for vertical-horizontal coupling vibration of the corrugated rolling mill of claim 1, comprising a control device for vertical-horizontal coupling vibration, a sensor mounting base (16), a laser horizontal velocity sensor (17), a laser vertical velocity sensor (18), a rolling force sensor (19), horizontal force sensors (20), filters (21), a computer (22), a horizontal vibration controller (23) and a vertical vibration controller (24), wherein switching magnetic seats (25) are arranged at left and right sides of a housing (1) in the control device for vertical-horizontal coupling vibration; the control device for vertical-horizontal coupling vibration is adsorbed on an upper balance beam (26) of the corrugated rolling mill by the switching magnetic seats (25); the upper balance beam (26) is connected with an upper roll bearing chock (27); the sensor mounting base (16) is fixedly mounted at one side of a rack (29); both the laser horizontal velocity sensor (17) and the laser vertical velocity sensor (18) are mounted on the sensor mounting base (16), respectively for real-time online non-contact measurement of movement velocities of the upper roll bearing chock (27) in a horizontal direction and a vertical direction during rolling of a composite plate; the rolling force sensor (19) is mounted between a press-down device (28) and the upper roll bearing chock (27), for real-time measurement of a rolling force in the vertical direction during the rolling of the composite plate; the horizontal force sensors (20) are mounted between the upper roll bearing chock (27) and the rack (29) and between a lower roll bearing chock (30) and the rack (29); the horizontal force sensors (20) are used for real-time measurement of a rolling force component in the horizontal direction during the rolling of the composite plate; the laser horizontal velocity sensor (17), the laser vertical velocity sensor (18), the rolling force sensor (19) and the horizontal force sensors (20) are all connected with the computer (22) through the filters (21), for transmitting the measured signals to the computer (22); the computer (22) calculates a vibration power flow in the vertical direction and a vibration power flow in the horizontal direction according to the measured signals; the computer (22) is connected with the horizontal vibration controller (23) and the vertical vibration controller (24), for transmitting control signals to the horizontal vibration controller (23) and the vertical vibration controller (24); and the horizontal vibration controller (23) and the vertical vibration controller (24) are respectively used for controlling the first linear motor (8) and the second linear motor (12) in the control device for vertical-horizontal coupling vibration to work.

6. A control method based on the control system for vertical-horizontal coupling vibration of the corrugated rolling mill of claim 5, comprising: performing real-time online non-contact measurement of a movement velocity of an upper roll bearing chock (27) in a horizontal direction during rolling of a composite plate by a laser horizontal velocity sensor (17); performing real-time online non-contact measurement of a movement velocity of the upper roll bearing chock (27) in a vertical direction during the rolling of the composite plate by a laser vertical velocity sensor (18); performing real-time measurement of a rolling force in the vertical direction during the rolling of the composite plate by a rolling force sensor (19); performing real-time measurement of a rolling force component in the horizontal direction during the rolling of the composite plate by horizontal force sensors (20); and receiving signals transmitted back by the laser horizontal velocity sensor (17), the laser vertical velocity sensor (18), the rolling force sensor (19) and the horizontal force sensors (20), and calculating a vibration power flow in the vertical direction and a vibration power flow in the horizontal direction by a computer (22), specifically, $$W_{horizontal} = k_{horizontal} \times F_{horizontal} \times V_{horizontal}$$

wherein $W_{horizontal}$ represents the vibration power flow in the horizontal direction, and $k_{horizontal}$ represents a horizontal vibration influence factor;

$F_{horizontal}$ represents the rolling force component obtained by the horizontal force sensors (20) through online real-time measurement;

$V_{horizontal}$ represents the movement velocity of the upper roll bearing chock (27) in the horizontal direction obtained by the laser horizontal velocity sensor (17) through online real-time measurement;

$$W_{vertical} = k_{vertical} \times F_{vertical} \times V_{vertical}$$

wherein $W_{vertical}$ represents the vibration power flow in the vertical direction, and $k_{vertical}$ represents a vertical vibration influence factor;

$F_{vertical}$ represents the rolling force obtained by the rolling force sensor (19) through online real-time measurement;

$V_{vertical}$ represents the movement velocity of the upper roll bearing chock (27) in the vertical direction obtained by the laser vertical velocity sensor (18) through online real-time measurement;

when $W_{horizontal} \geq W_{horizontal0}$, the computer (22) sends a control signal to a horizontal vibration controller (23), and the horizontal vibration controller (23) starts to work and sends a vibration-absorbing signal to a first linear motor (8), so that the first linear motor (8) starts to work;

$W_{horizontal0}$ represents a set threshold value of the vibration power flow in the horizontal direction;

when $W_{vertical} \geq W_{vertical0}$, the computer (22) sends a control signal to a vertical vibration controller (24), and the vertical vibration controller (24) sends a vibration-absorbing signal to a second linear motor (12), so that the second linear motor (12) starts to work;

$W_{vertical0}$ represents a set threshold value of the vibration power flow in the vertical direction.

* * * * *